United States Patent [19]
Kissinger

[11] 3,871,602
[45] Mar. 18, 1975

[54] CIRCULAR WING AIRCRAFT

[75] Inventor: Curtis D. Kissinger, Gloversville, N.Y.

[73] Assignee: Panaflight Corporation, Albany, N.Y.

[22] Filed: Sept. 4, 1973

[21] Appl. No.: 394,195

Related U.S. Application Data
[63] Continuation of Ser. No. 198,704, Nov. 15, 1971, abandoned.

[52] U.S. Cl. .................. 244/13, D12/78, 46/78, 244/34 A, 244/45 R
[51] Int. Cl. .............................................. B64c 3/12
[58] Field of Search ........ 244/12 R, 12 C, 13, 23 R, 244/23 C, 34 R, 34 A, 35 R, 45 R; D12/71, 78; 46/74 R, 76 R, 78

[56] References Cited
UNITED STATES PATENTS

| | | | |
|---|---|---|---|
| 1,523,994 | 1/1925 | Myers | 244/35 R |
| 1,726,558 | 9/1929 | Hall | 244/13 |
| 2,063,456 | 12/1936 | Nemeth | 244/35 R |
| 2,713,465 | 7/1955 | Novinger | 244/45 R X |
| 2,864,567 | 12/1958 | Kissinger | 244/13 |
| 2,957,647 | 10/1960 | Shew | 244/45 R X |
| 3,078,062 | 2/1963 | Fischer | 244/12 C X |
| 3,081,965 | 3/1963 | Shew | 244/12 CW |
| 3,138,347 | 6/1964 | Rodriguez | 244/12 R |
| D177,547 | 4/1956 | Wen | D12/78 |
| D198,249 | 5/1964 | Sleeman et al. | D12/71 |

Primary Examiner—Trygve M. Blix
Assistant Examiner—Barry L. Kelmachter
Attorney, Agent, or Firm—Shenier & O'Connor

[57] ABSTRACT

An improved circular wing aircraft in which the main airfoil is of generally circular shape having a pair of vertical stabilizers running along chords of the circle and equally spaced from the longitudinal axis of the craft from points just ahead of the leading edge of the craft to points behind the trailing edge thereof in which a cut-out portion of the airfoil is displaced rearwardly and held in an elevated position by the vertical stabilizers so as to form a space in which a pushed prime mover is located. The central portion of the wing between the vertical stabilizers is provided with an undercamber.

6 Claims, 5 Drawing Figures

PATENTED MAR 18 1975

INVENTOR.
Curtis D. Kissinger
BY
ATTORNEYS

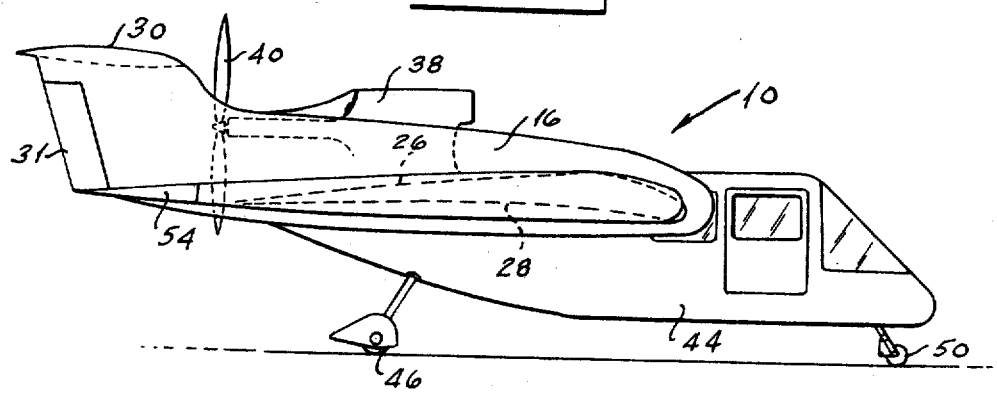
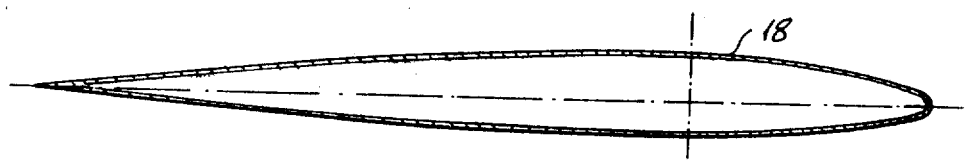
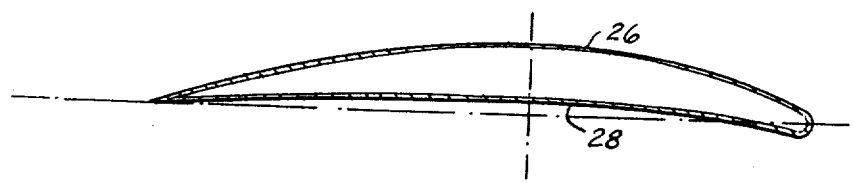
INVENTOR.
Curtis D. Kissinger
BY
Shenier & O'Connor
ATTORNEYS ated Dec. 16, 1958 for "Aircraft."

CIRCULAR WING AIRCRAFT

This is a continuation of application Ser. No. 198,704, filed Nov. 15, 1971, now abandoned.

BACKGROUND OF THE INVENTION

Various efforts have been made in the prior art to provide an aircraft having good maneuverability at relatively low speeds. Such an aircraft should be stable in flight and should permit take-off and landings at relatively low speeds. A particular example of an aircraft capable of such operation is shown in my prior U.S. Pat. No. 2,864,567 issued Dec. 16, 1958 for "Aircraft."

While the aircraft shown in my prior patent referred to hereinabove successfully achieves the objects of providing low landing and take-off speeds, and good maneuverability at low speed its operation is not as ideal as is desirable. I have provided an improved form of the aircraft shown in my prior patent which enhances its desirable characteristics. The slow speed and landing characteristics of my improved aircraft are superior to those of aircraft of the prior art. My aircraft has improved lateral and directional stability and control. It provides a more positive pitch control.

SUMMARY OF THE INVENTION

One object of my invention is to provide an improved circular wing aircraft having superior low-speed handling characteristics over aircraft of the prior art.

Another object of my invention is to provide an improved circular wing aircraft which is capable of low speed take-off and landing.

A further object of my invention is to provide an improved circular wing aircraft which can be flown at high angles of attack without loss of lateral or directional stability and control.

Another object of my invention is to provide an improved circular wing aircraft which is relatively simple in construction for the result achieved thereby.

A further object of my invention is to provide an improved circular wing aircraft having greater safety and reduced noise level.

Other and further objects of my invention will appear from the following description:

In general my invention contemplates the provision of an improved aircraft the main airfoil of which is generally circular in shape and which is provided with a pair of spaced vertical stabilizers extending along chords of the circle and equally spaced from the aircraft center line from points ahead of the leading edge to points behind the trailing edge with a cut-out portion of the airfoil bounded at its lateral edges by the chords displaced upwardly and rearwardly and supported by the vertical stabilizers so as to provide a space for a pusher type engine. The outer wing sections which have a normal camber may be provided with spoilers in addition to ailerons while the center section of the airfoil between the vertical stabilizers has a higher degree of camber to enhance its lifting effect.

BRIEF DESCRIPTION OF THE DRAWINGS

In the accompanying drawings which form part of the instant specification and which are to be read in conjunction therewith and in which like reference numerals are used to indicate like parts in the various views:

FIG. 3 is a side elevation of my improved circular wing aircraft.

FIG. 4 is a sectional view of my improved circular wing aircraft taken along the line 4—4 of FIG. 1.

FIG. 5 is a sectional view of my improved circular wing aircraft taken along the line 5—5 of FIG. 1.

DESCRIPTION OF THE PREFERRED EMBODIMENT

Figure 1:
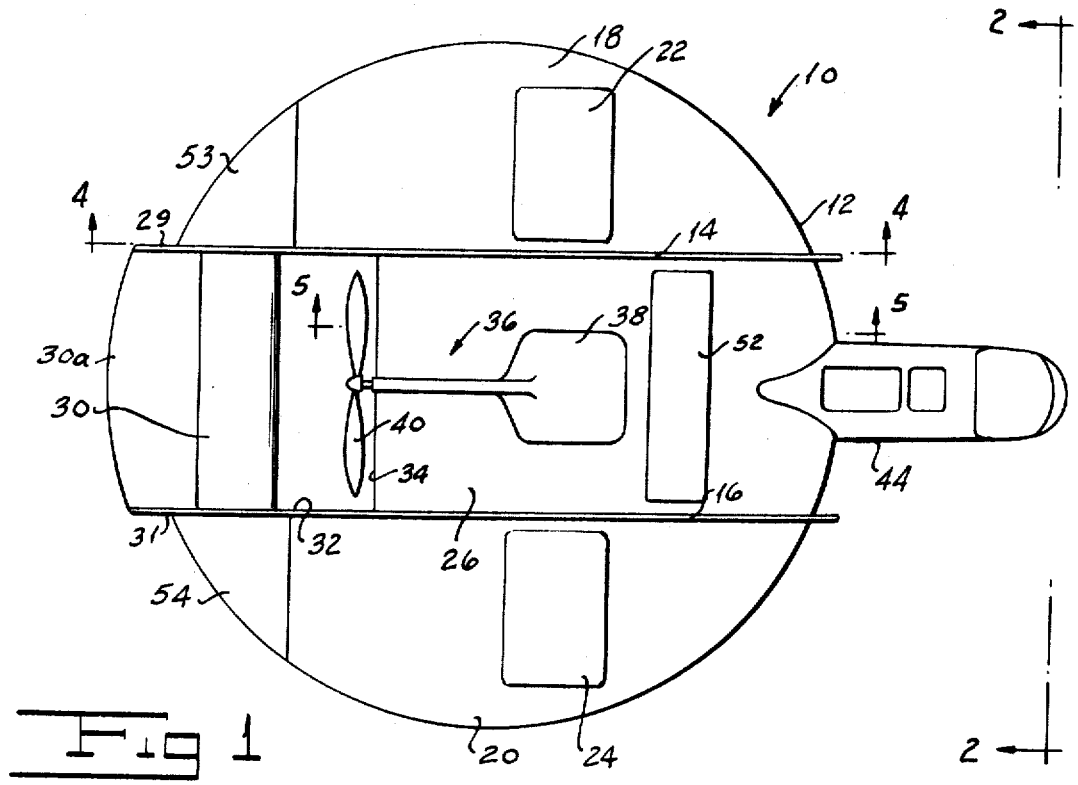
FIG. 1 is a top plan view of my improved circular wing aircraft.

Referring now more particularly to the drawings, my improved circular wing aircraft, indicated generally by the reference character 10 includes a generally circular wing 12. Respective vertical stabilizers 14 and 16 extend entirely through the wing 12 along spaced chords generally parallel to and equally spaced from the longitudinal axis of the aircraft. These stabilizers extend from points slightly ahead of the leading edge of the circular section to points behind the trailing edge. They are, moreover, as can be seen by reference to FIG. 3 provided with upwardly extending portions adjacent to the tail of the aircraft.

The vertical stabilizers 14 and 16 divide the wing 12 into outer wing sections 18 and 20, each of which has a conventional camber forming a convex bottom airfoil such, for example, as NACA 2409. The stabilizers 14 and 16 further form a central section 26 which I form with a concave botton such, for example, as NACA No. 6409, as shown in FIG. 5. I have indicated this by the reference character 28.

I provide a horizontal stabilizer by cutting a portion 30 out of the rear of the central section of the wing 12 and mounting it at the upper edges of the vertically extending air portions of the stabilizers 14 and 16. The lower portions of vertical stabilizers 14 and 16 form a boundry between the concave bottom of the center section 26 and convex bottom of the outer portions 18 and 20. In addition I space the leading edge of the horizontal stabilizer 30 rearwardly from the trailing edge 34 of the forward center wing section 26 to provide an opening 32. This may be achieved either by moving section 30 rearwardly with respect to the section 26 or by displacing the trailing edge 34 forwardly of the edge of the cutout section. Preferably I move the elevator section rearwardly for increased leverage.

I mount the power plant, indicated generally by the reference character 36, of my aircraft on or in the central wing section 26. Power plant 36 may include an engine 38 adapted to drive a pusher propeller 40 located in the opening 32 adjacent to the trailing edge 34 of the forward wing section 26. It will readily be appreciated that the horizontal stabilizer may be provided with a moveable "elevator" portion 30A, or may be fully moveable. It will also be readily appreciated that alternatively to providing an engine 38 and the propeller 40 I might use a jet engine. The aircraft includes a fuselage providing a cabin section 44 having landing wheels 46 and 48 and a nose wheel 50. A larger version of this aircraft may have the cabin section enclosed entirely within the wing structure.

From the structure described thus far, it will be seen that the vertical stabilizers 14 and 16 provide a tunnel-like space 42 for the flow of air in a fore-and-aft direction over and under the central wing section 26. Owing to the fact that a pusher-like power plant 36 is employed, the air flow over the wing is relatively undisturbed. Moreover, propeller 40 moves air to the stabilizer and rudders 29 and 31 with more force than do conventional drive systems which results in greatly improved elevator and rudder control at slow forward speeds. Location of the wing section just ahead of the propeller permits the wing to act as a turning vane for the air flow entering the propeller. This results in improved propeller performance and reduction of asymmetrical thrust at high angles of attack.

The construction of my improved aircraft has features resulting in improved operation over the aircraft shown in my U.S. Pat. No. 2,864,567. First, I provide the space for opening 32 and the resultant tunnel space 42 which provides a space in which the propeller 40 may operate. As a result propeller inflow acts on the center section of the wing to create some static lift and also acts to delay stalling at high angles of attack. The increased force of the outflow from the propeller 40 which is directed onto the stabilizer 30 and rudders 29 and 31 provide more positive pitch control and directional at lower speed.

In my aircraft, moreover, I may employ spoilers 22 and 24 in the outer wing sections 18 and 20. These control spoilers are located at or slightly ahead of the high point of each wing tip. They may be used in addition to, or in conjunction with ailerons 53 and 54 to provide improved roll control for the aircraft.

Further as is pointed out hereinabove while the outer wing sections 18 and 20 have a conventional camber providing a convex bottom airfoil, the central wing section 26 is formed with a concave bottom airfoil. This arrangement achieves a more even lift distribution across the wing 12. As a consequence, the central portion of the wing contributes its proper share of the overall lift. Since the concave bottom center section develops a comparatively higher lift for a given angle of attack than does a conventional airfoil, my arrangement provides a more even spanwise lift distribution and performance of the wing 12 is improved.

I may, if desired, provide a lift-destroying spoiler 52 across the center portion of the wing. This could be used during landing of the aircraft to lessen lift just prior to touchdown. As a consequence, more effective braking action is provided and the tendency of the aircraft to float just above the runway owing to the large ground cushion effect is reduced.

In operation of my improved circular wing aircraft propeller 40 is driven by motor 38 to draw air rearwardly over the central wing section 26. The vertical stabilizers 14 and 16, which extend the full length of the main airfoil, act as wing "fences" to control the flow of air and to minimize "spanwise" flow. With the trailing edge of stabilizer 30 behind the circular wing surface more leverage and more effective control are provided. The spoilers 22 and 24 and ailerons 53 and 54 in the outer wing sections may be operated by any suitable mechanism known to the art. Rudders 29 and 31 also provided at the rear of vertical stabilizers 14 and 16 are used for directional control. Their effectiveness at low forward speeds is enhanced by the air flow from propeller 40.

Figure 2:
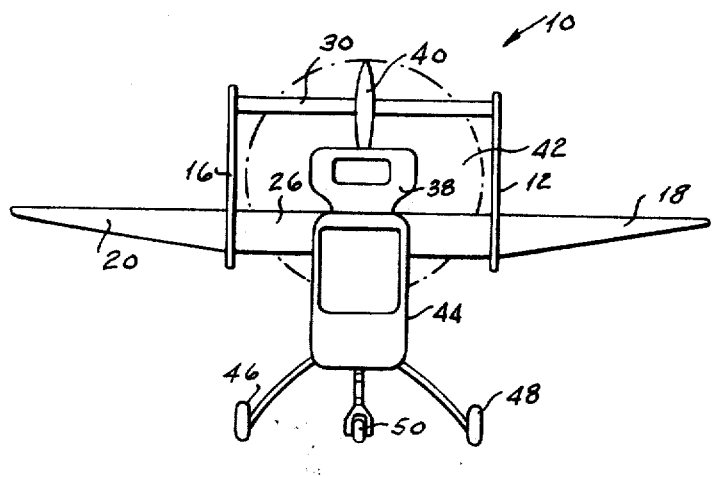
FIG. 2 is a front elevation of my improved circular wing aircraft.

It is to be noted, as can be seen from FIG. 2 that the high points of the outer wing sections and of the central wing section are located on a straight line extending in a transversly skewed direction. Location of the pusher propeller 40 in the space 32 not only provides improved performance by enhancing the lifting action of the center wing section, by increasing the effectiveness of the elevator and rudders, by improving the operation of the propeller at high angles of attack, but it is safer in that the propeller is not located outside the periphery of the aircraft. Moreover, noise in the cabin is reduced. Spoiler 52 may be operated on landing to reduce the cushion effect of the wing.

It will be seen that I have accomplished the objects of my invention. I have invented an improved circular wing aircraft which has improved performance and safety over circular wing aircraft of the prior art. My improved aircraft has improved lateral, directional and pitch stability and control. It is capable of taking off and of landing at relatively slow speeds and possesses a greater speed ratio. My aircraft incorporates an airfoil providing a higher lift than do circular aircraft with conventional airfoils.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An improved aircraft including in combinataion, a main airfoil having a first certain outline configuration when viewed from the top thereof, respective elongated vertical members on opposite sides of and equally spaced from the fore-and-aft centerline of said main airfoil, said vertical members extending generally parallel to said fore-and-aft axis throughout said airfoil from the leading edge thereof to the trailing edge thereof and positioned inboard of the outboard edges of said airfoil to divide said main airfoil into a relatively independent central section between said members, and respective outer sections outboard of said members, said members projecting above the upper surface of said main airfoil and projecting below the under surface of the main airfoil to form tunnel-like spaces for the flow of air from the leading edge to the trailing edge of the airfoil over and under the central section thereof, said outer sections extending rearwardly of said central section to provide outer section inboard edges extending rearwardly from the trailing edge of said central section to the trailing edges of said outer sections, said inboard edges and said central section trailing edge forming a second certain outline configuration, a horizontal stabilizer formed with a leading edge and outer edges in said second outline configuration, and means including upwardly extending portions of said vertical members adjacent to the trailing edges of said outer sections to provide vertical stabilizers for mounting said horizontal stabilizer above said main airfoil and with the leading edge of said horizontal stabilizer spaced rearwardly from said central section trailing edge, said central section being formed with a concave bottom surface and said outer sections being formed with convex bottom surfaces.

2. An improved aircraft as in claim 1 in which the trailing edge of said horizontal stabilizer extends to a location rearward of said outer airfoil sections.

3. An improved aircraft as in claim 1 in which said vertical members extend from points ahead of the leading edges of said outer wing section to points beyond the trailing edges of the outer wing sections.

4. An improved aircraft as in claim 1 including spoilers and ailerons located in said outer wing sections.

5. An improved aircraft as in claim 1 including a spoiler in said central section.

6. An improved aircraft as in claim 1 including a pusher engine mounted adjacent to the trailing edge of said center section with the propeller thereof in the space between the center section trailing edge and the leading edge of the horizontal stabilizer.

* * * * *